(12) United States Patent
Zhang et al.

(10) Patent No.: US 11,475,874 B2
(45) Date of Patent: Oct. 18, 2022

(54) GENERATING DIVERSE AND NATURAL TEXT-TO-SPEECH SAMPLES

(71) Applicant: Google LLC, Mountain View, CA (US)

(72) Inventors: Yu Zhang, Mountain View, CA (US); Bhuvana Ramabhadran, Mt. Kisco, NY (US); Andrew Rosenberg, Mountain View, CA (US); Yonghui Wu, Fremont, CA (US); Byungha Chun, Tokyo (JP); Ron Weiss, New York, NY (US); Yuan Cao, Mountain View, CA (US)

(73) Assignee: Google LLC, Mountain View, CA (US)

(*) Notice: Subject to any disclaimer, the term of this patent is extended or adjusted under 35 U.S.C. 154(b) by 79 days.

(21) Appl. No.: 17/163,007

(22) Filed: Jan. 29, 2021

(65) Prior Publication Data
US 2022/0246132 A1    Aug. 4, 2022

(51) Int. Cl.
*G10L 25/30*    (2013.01)
*G10L 25/00*    (2013.01)
(Continued)

(52) U.S. Cl.
CPC ............... *G10L 13/047* (2013.01); *G06N 3/08* (2013.01); *G10L 13/10* (2013.01); *G10L 15/063* (2013.01); *G10L 25/18* (2013.01)

(58) Field of Classification Search
CPC .......... G10L 15/00; G10L 25/30; G10L 25/00
See application file for complete search history.

(56) References Cited

U.S. PATENT DOCUMENTS

2021/0056348 A1*    2/2021    Berlin ................... G06K 9/6256
2022/0068259 A1*    3/2022    Pan .......................... G10L 25/30

FOREIGN PATENT DOCUMENTS

CN    110930977 A    *    3/2020
KR    20200111609 A    *    9/2020

OTHER PUBLICATIONS

Apr. 8, 2022 Written Opinion (WO) of the International Searching Authority (ISA) and International Search Report (ISR) issued in International Application No. PCT/US2022/013351.

(Continued)

*Primary Examiner* — Shreyans A Patel
(74) *Attorney, Agent, or Firm* — Homgman LLP; Brett A. Krueger

(57) ABSTRACT

A method of generating diverse and natural text-to-speech (TTS) samples includes receiving a text and generating a speech sample based on the text using a TTS model. A training process trains the TTS model to generate the speech sample by receiving training samples. Each training sample includes a spectrogram and a training text corresponding to the spectrogram. For each training sample, the training process identifies speech units associated with the training text. For each speech unit, the training process generates a speech embedding, aligns the speech embedding with a portion of the spectrogram, extracts a latent feature from the aligned portion of the spectrogram, and assigns a quantized embedding to the latent feature. The training process generates the speech sample by decoding a concatenation of the speech embeddings and a quantized embeddings for the speech units associated with the training text corresponding to the spectrogram.

20 Claims, 7 Drawing Sheets

(51) Int. Cl.
*G10L 17/00* (2013.01)
*G10L 13/047* (2013.01)
*G10L 25/18* (2013.01)
*G06N 3/08* (2006.01)
*G10L 15/06* (2013.01)
*G10L 13/10* (2013.01)

(56) References Cited

OTHER PUBLICATIONS

Sun Guangzhi et al: "Generating Diverse and Natural Text-to-Speech Samples Using a Quantized Fine-Grained VAE and Autoregressive Prosody Prior", ICASSP 2020—2020 IEEE International Conference On Acoustics, Speech and Signal Processing (ICASSP), IEEE, May 4, 2020 (May 4, 2020), pp. 6699-6703, XP033793100, DOI: 10.1109/ICASSP40776.2020.9053436.
Chien Chung-Ming et al: "Hierarchical Prosody Modeling for Non-Autoregressive Speech Synthesis", Nov. 17, 2020 (Nov. 17, 2020), XP055906587.

\* cited by examiner

GENERATING DIVERSE AND NATURAL TEXT-TO-SPEECH SAMPLES

TECHNICAL FIELD

This disclosure relates to generating diverse and natural text-to-speech samples.

BACKGROUND

Speech synthesis systems use text-to-speech (TTS) models to generate speech from textual input. The generated/synthesized speech should accurately convey the message (intelligibility) while sounding like human speech (naturalness) with an intended prosody (expressiveness). While traditional speech synthesis models are capable of providing intelligible speech, recent advances in neural modeling of speech have significantly improved the naturalness and fidelity of synthesized speech. Yet even with these advances, often times synthesized speech generated by TTS models focuses more on naturalness rather than a diversity among the samples it generates. With this focus, the development of TTS models unfortunately lacks the ability to be both diverse and natural. That is, current TTS models trade-off diversity for naturalness such that synthesized speech has approached human levels of naturalness, but typically with minimal to little diversity.

SUMMARY

One aspect of the disclosure provides a computer-implemented method of generating diverse and natural text-to-speech samples. The computer-implemented method, when executed by data processing hardware, causes the data processing hardware to perform operations. The operations include receiving a sequence of text and generating one or more speech samples based on the sequence of text using a text-to-speech (TTS) model. The TTS model is trained to generate the one or more speech samples by receiving a plurality of training samples. Each training sample of the plurality of training samples includes a reference spectrogram and a training sequence of text corresponding to the reference spectrogram. For each training sample of the plurality training samples, TTS model is trained to identify a sequence of speech units associated with the training sequence of text corresponding to the reference spectrogram. For each speech unit of the sequence of speech units, the TTS model is trained to generate a speech embedding, align the speech embedding with the corresponding portion of the reference spectrogram, extract a latent feature from the corresponding portion of the reference spectrogram aligned with the speech embedding, and assign a quantized embedding to the latent feature from the corresponding portion of the reference spectrogram aligned with the speech embedding. The TTS model is trained to generate the one or more speech samples by decoding a concatenation of the speech embeddings and a quantized embeddings for the sequence of speech units associated with the training sequence of text corresponding to the reference spectrogram.

Another aspect of the disclosure provides a system for generating diverse and natural text-to-speech samples. The system, when executed by data processing hardware, causes the data processing hardware to perform operations. The operations include receiving a sequence of text and generating one or more speech samples based on the sequence of text using a text-to-speech (TTS) model. The TTS model is trained to generate the one or more speech samples by receiving a plurality of training samples. Each training sample of the plurality of training samples includes a reference spectrogram and a training sequence of text corresponding to the reference spectrogram. For each training sample of the plurality training samples, TTS model is trained to identify a sequence of speech units associated with the training sequence of text corresponding to the reference spectrogram. For each speech unit of the sequence of speech units, the TTS model is trained to generate a speech embedding, align the speech embedding with the corresponding portion of the reference spectrogram, extract a latent feature from the corresponding portion of the reference spectrogram aligned with the speech embedding, and assign a quantized embedding to the latent feature from the corresponding portion of the reference spectrogram aligned with the speech embedding. The TTS model is trained to generate the one or more speech samples by decoding a concatenation of the speech embeddings and a quantized embeddings for the sequence of speech units associated with the training sequence of text corresponding to the reference spectrogram.

Implementations of either aspect of the disclosure may include one or more of the following optional features. In some implementations, assigning the quantized embedding to the latent feature from the corresponding portion of the reference spectrogram aligned with the speech embedding includes assigning the quantized embedding to the latent feature from the corresponding portion of the reference spectrogram aligned with the speech embedding after sampling the quantized embedding from a posterior distribution in a continuous latent space. In some examples, the operations further include, during training the TTS model, generating, as output from the TTS model, a posterior distribution for the plurality of training samples and training an autoregressive (AR) prior neural network to generate a prior distribution by fitting the generated posterior distribution over the plurality of training samples. Generating the one or more speech samples may be based on sampling the prior distribution from the trained AR prior neural network.

In some examples, the operations further include, during training of the TTS model, determining a reconstruction loss represented as a likelihood probability based on the speech embedding and the latent feature. In these examples, the operations also include, during training of the TTS model, determining a KL divergence between a prior distribution of the latent feature and a posterior distribution of the latent feature. Here, during training of the TTS model, the operations additionally include optimizing an evidence lower bound (ELBO) loss of the TTS model based on a difference between the determined reconstruction loss and the determined KL divergence.

In some configurations, the operations further include, for each of a plurality of available quantized embeddings, determining a Euclidean distance between the corresponding quantized embedding and the latent feature extracted from the corresponding portion of the reference spectrogram aligned with the speech embedding. These operations also include selecting, from among the plurality of available quantized embeddings, the quantized embedding associated with a minimum Euclidean distance between the corresponding quantized embedding and the latent feature extracted from the corresponding portion of the reference spectrogram aligned with the speech embedding. Here, assigning the quantized embedding to the latent feature includes assigning the selected quantized embedding associated with the minimum Euclidean distance.

The sequence of speech units may include a sequence of phonemes. The latent feature may include a latent prosody feature. The one or more speech samples include a first speech sample and a second speech sample where the first speech sample having different speech attributes than the second speech sample. The operations may also include training a speech recognition model using the one or more speech samples generated by the TTS model.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Figure 1:
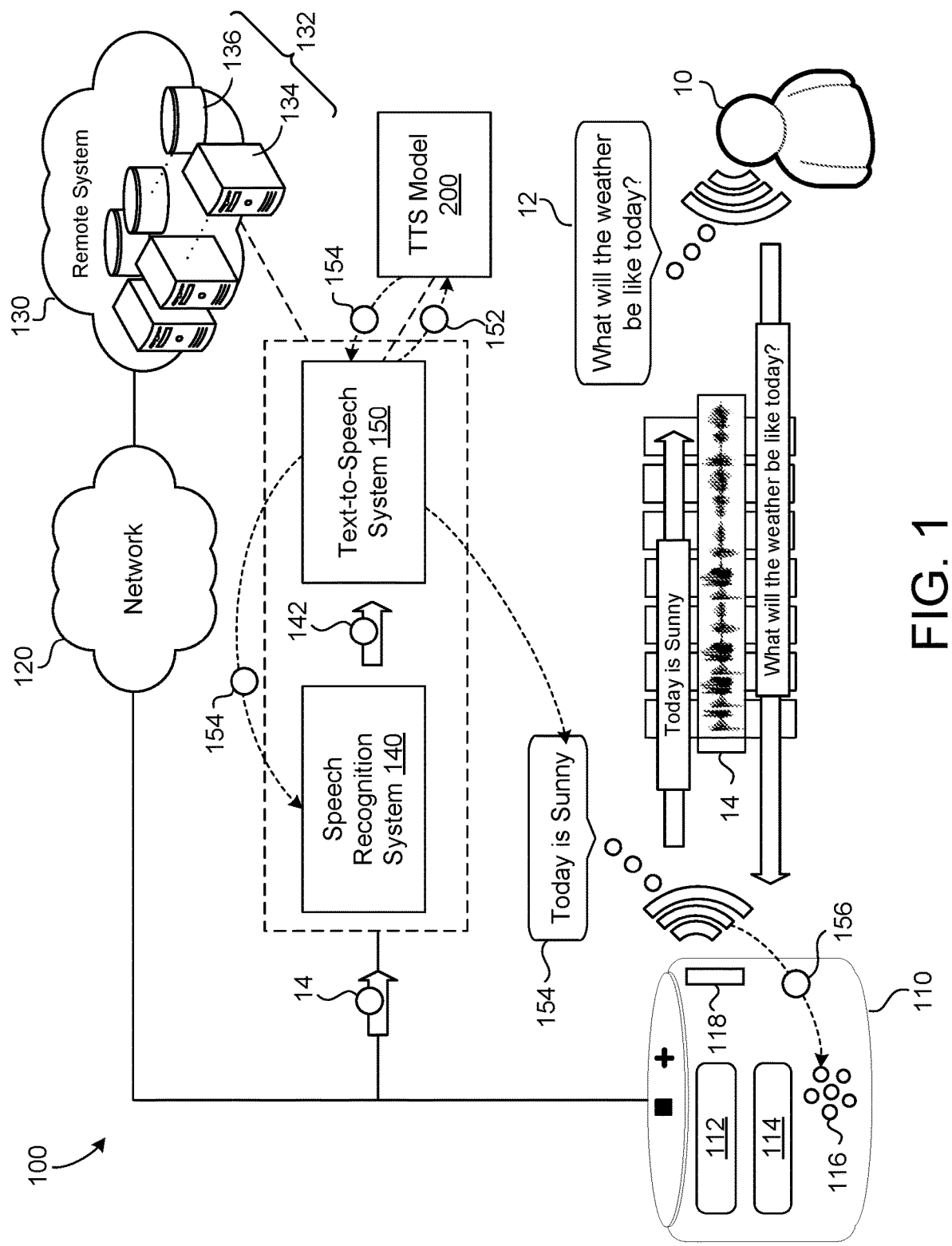
FIG. 1 is a schematic view of an example speech environment for generating diverse and natural text-to-speech samples.

Fast-paced development of neural end-to-end text-to-speech (TTS) synthesis has enabled the generation of speech approaching human levels of naturalness. As TTS systems focused on generating natural synthesized speech, these TTS systems generally did not equally focus on generating diverse synthesized speech samples. This was a natural progression because it is inherently preferable for synthesized speech to sound less robotic and more human rather than to sound robotic in many different ways (i.e., diversely robotic). Due to this progression, the naturalness of a synthesized speech sample was often at the tradeoff of sample diversity. This means that a voice assistant for a user may sound like John Legend or Issa Rae, but John Legend's voice as synthesized speech may not have a diverse array of vocal inflections.

On a practical level, speech sample diversity refers to the ability of a TTS system to generate variation between two speech samples produced from the same input text. When an utterance is spoken, the utterance may include speech-related attributes specific to the speaker (e.g., speaker style or speaker pitch), background noise, channel properties (e.g., reverberation), and/or the spoken prosody (e.g., stress, intonation, and/or rhythm). Each of these attributes may introduce some level of variation when the utterance is captured as a speech sample. Generally, TTS models associated with a TTS system directly map an input text to a sequence of acoustic features using an encoder-decoder neural network architecture. Since the input to a TTS model is text, samples of text provided as input to train a TTS model lack contextual information about how the output synthesized speech of the text should sound. In other words, what speech attributes the synthesized speech should have. For instance, a synthesized speech utterance from input text should convey different speech-related attributes and prosody for a speaker in a newscaster domain than for a speaker in a sports commentator domain.

Due to the lack of contextual information from the text regarding how the output synthesized speech should sound, TTS systems have evolved to provide additional input beyond text to the TTS model. In some approaches, speech-related attributes are accounted for in the TTS model (i.e., a speech synthesis model) by structuring the TTS model as a latent variable model. Latent variable models operate to generate a probability distribution over input data (e.g., observable input variable(s)) expressed as a function of the input variable and an unobserved latent (or hidden) variable. That is, the probability distribution is referred to as a posterior distribution that expresses input data as latent variables that define a latent space. Here, the latent variables, or more particularly, the latent features, represent speech-related attributes that are not readily observable as part of the data set (e.g., the sequence of text) input into the TTS model. Therefore, the TTS system generates a latent representation that indicates speech attributes, such as who generated the text (e.g., the author of the text) or how the person sounds who generated the text. With this approach, the latent modeling process may account for the fact that text, by itself, does not naturally include speech-related attributes, such as prosodic elements (e.g., stress, intonation, and/or rhythm), characteristics of the speaker (e.g., speaker pitch or tone), or characteristics of the environment (e.g., background noise, reverberation, etc.).

Yet the evolution of latent variable models have been somewhat limited in their ability to generate diverse synthesized speech samples. For instance, although some TTS modeling approaches have aimed to capture speech-related attributes as a latent representation, these approaches extract a single latent variable for an entire utterance. What this means is that this approach may produce some level of diverse synthesized speech samples, but this diversity occurs on a macro level. This macro approach is diverse in that a speech sample may roughly capture the speaking style or some level of emotion, but lacks any diversity as to speech attributes related to sub-portions of the speech sample. One such model that takes this approach is a TTS model that uses a vector-quantized variational autoencoder (VQ-VAE). As a VQ-VAE, the quantization occurs over an entire vector for a target speech sample in a global fashion. This results in a single global representation to capture the full space of variation across speech signals of arbitrary length. In this respect, a synthesized speech sample that states, "The weather is 72 degrees and sunny today," using the VQ-VAE approach might consistently sound generally bright, happy, and/or upbeat, but not vary which parts of that sentence sound bright and upbeat. By operating on a macro-level, the degree to which this VQ-VAE approach can generate diverse speech sample is limited.

Due to human nature, when a human provides spoken utterances, samples captured from these utterances will have minor variations often with regard to prosodic elements. Since these minor variations are present in human speech, systems that recognize human speech, such as speech recognition systems, are typically trained on actual human speech samples. In contrast, if speech recognition systems were trained on synthesized speech samples, the speech recognition system would be trained with samples that had little to no diversity. The speech recognition system may therefore fail to recognize these minor variations in human speech during inference. Practically speaking, this means that training a speech recognition system with conventional synthesized speech samples that lack diversity would likely result in a less robust and/or less accurate speech recognition system when compared to a speech recognition system that is trained on some number of actual human samples. With this being the case, existing TTS models are generally unable to produce synthesized speech samples that by themselves are able to train a speech recognition system that is both robust and accurate for recognizing human speech.

To overcome the lack of diversity in synthesized speech samples, a TTS model may use a fine-grained approach rather than a coarse-grained approach (i.e., macro-level approach). This means that instead of a single latent variable for an entire utterance, the model includes a structure that encodes speech-related attributes from sub-portions of a target speech sample. For instance, the fine-grained structure encodes the prosody associated with each phoneme in a target speech sample. With this approach, a fine-grained TTS model can synthesize speech that resembles speech-related attributes of the provided reference speech and/or control these speech-related attributes by varying the values of corresponding latent features. In some examples, to achieve this fine-grained structure, the TTS model uses a VAE, much like the macro-level approach, but instead changes the quantization to occur at a sub-portion of the target speech samples (e.g., at the phonemes of the target speech sample). This is referred to as a quantized fine-grained VAE (QF-VAE).

Unfortunately, quantization at a fine-grained level may impair some of the naturalness of synthesized speech samples. For example, since each sub-portion is now independently represented in the latent space, synthesized speech samples formed from these independent representations may exhibit unnatural sounds from discontinuous and unnatural artifacts such as long pauses between syllables or sudden increases in energy. Granted, there exists techniques to resolve some of these unnatural sounds, but these techniques often result in a suppression of the diversity for the synthesized speech sample, which may defeat the purpose of performing fine-grained quantization. For instance, one approach scales down a standard deviation of a prior distribution during sample generation, which decreases a likelihood of sampling outlier values. To avoid compromising the diversity of synthesized speech samples while also promoting a level of naturalness that has come to be expected for synthesized speech samples, the TTS system uses an autoregressive (AR) prior model that has been trained to fit the posterior distribution of the QF-VAE. With an AR prior model, the model may learn the temporal dynamics across latent features and allow the TTS system to generate synthesized speech samples that are both diverse and natural.

By producing both diverse and natural synthesized samples, these synthesized speech samples from the TTS system may be incorporated into other speech systems. For example, a speech recognition system may train using synthesized speech samples that are both diverse and natural. This may be particularly advantageous in situations where a speech recognition has an inadequate number of training examples from actual human speech. Here, the synthesized speech samples generated by the TTS system may supplement or augment the number of training examples of human speech available to the speech recognition system; allowing the speech recognition system to be sufficiently trained and/or still trained on the minor prosodic variations that would normally be present in human speech samples. Additionally or alternatively, these diverse and natural synthesized speech samples may entirely train a speech recognition system without requiring additional human speech training samples. Here, training a speech recognition system using solely synthesized speech samples may avoid costly processes of capturing training samples of human speech and help to consistently train speech recognition systems with an adequate number of speech samples.

Referring to FIG. 1, in some implementations, a speech environment 100 includes a user 10 communicating a spoken utterance 12 to a speech-enabled device 110 (also referred to as a device 110 or a user device 110). The user 10 (i.e., speaker of the utterance 12) may speak the utterance 12 as a query or a command to solicit a response from the device 110 or to have the device 110 execute a task specified by the query. The device 110 is configured to capture sounds from one or more users 10 within the speech environment 100. Here, the audio sounds may refer to a spoken utterance 12 by the user 10 that functions as an audible query, a command for the device 110, or an audible communication captured by the device 110. Speech-enabled systems of the device 110 or associated with the device 110 (e.g., a digital assistant interface) may field the query for the command by answering the query and/or causing the command to be performed.

Here, the device 110 captures audio data 14 corresponding to the spoken utterance 12 by the user 10. The device 110 may correspond to any computing device associated with the user 10 and capable of receiving audio data 14. Some examples of user devices 110 include, but are not limited to, mobile devices (e.g., mobile phones, tablets, laptops, e-book readers, etc.), computers, wearable devices (e.g., smart watches), music player, casting devices, smart appliances (e.g., smart televisions) and internet of things (IoT) devices, remote controls, smart speakers, etc. The device 110 includes data processing hardware 112 and memory hardware 114 in communication with the data processing hardware 112 and storing instructions, that when executed by the data processing hardware 112, cause the data processing hardware 112 to perform one or more operations related to speech and/or text processing. In some examples, the device 110 includes one or more applications (i.e., software applications) where each application may utilize one or more speech processing systems/models 140, 150, 200 associated with device 110 to perform various functions within the application. For instance, the device 110 includes an assistant application configured to communicate synthesized playback audio 154 (also referred to as synthesized speech 154) to the user 10 to converse with the user 10 and assist with the performance of various tasks.

The device 110 further includes an audio subsystem with an audio capturing device (e.g., a microphone) 116 for capturing and converting audio data 14 within the speech environment 100 into electrical signals and a speech output device (e.g., a speaker) 118 for communicating an audible audio signal (e.g., a synthesized playback signal 154 from the device 110). While the device 110 implements a single audio capturing device 116 in the example shown, the device 110 may implement an array of audio capturing devices 116 without departing from the scope of the present disclosure, whereby one or more audio capturing devices 116 in the array may not physically reside on the device 110, but be in communication with the audio subsystem (e.g., peripherals of the device 110). For example, the device 110 may correspond to a vehicle infotainment system that leverages an array of microphones positioned throughout the vehicle. Similarly, the speech output device 118 may include one or more speakers either residing on the device 110, in communication therewith, or a combination where one or more speakers reside on the device 110 and one or more other speakers are physically removed from the device 110 but in communication with the device 110.

Furthermore, the device 110 is configured to communicate via a network 120 with a remote system 130. The remote system 130 may include remote resources 132, such as remote data processing hardware 134 (e.g., remote servers or CPUs) and/or remote memory hardware 136 (e.g., remote databases or other storage hardware). The device 110 may utilize the remote resources 132 to perform various functionality related to speech processing and/or synthesized playback communication. For instance, the device 110 is configured to perform speech recognition using a speech recognition system 140 and/or conversion of text to speech using a TTS system 150 (e.g., using the TTS model 200). These systems/models 140, 150, 200 may reside on the device 110 (referred to as on-device systems) or reside remotely (e.g., reside on the remote system 130), but in communication with the device 110. In some examples, some of these systems 140, 150, 200 reside locally or on-device while others reside remotely. In other words, any of these systems 140, 150, 200 may be local, remote, or both in any combination. For instance, when a system 140, 150, 200 is rather large in size or processing requirements, the system 140, 150, 200 may reside in the remote system 130. Yet when the device 110 may support the size or the processing requirements of one or more systems 140, 150, 200, the one or more systems 140, 150, 200 may reside on the device 110 using the data processing hardware 112 and/or the memory hardware 114. Optionally, the one or more of the systems 140, 150, 200 may reside on both locally/on-device and remotely. For instance, one or more of the systems 140, 150, 200 may default to execute on the remote system 130 when a connection to the network 120 between the device 110 and remote system 130 is available, but when the connection is lost or the network 120 is unavailable, the systems 140, 150, 200 instead execute locally on the device 110.

A speech recognition system 140 receives audio data 14 as an input and transcribes that audio signal into a transcription 142 as an output. Generally speaking, by converting the audio data 14 into a transcription 142, the speech recognition system 140 allows the device 110 to recognize when a spoken utterance 12 from the user 10 corresponds to a query, a command, or some other form of audio communication. That is, the speech recognition system 140 may include natural language understanding (NLU) functionality to perform query interpretation (e.g., semantic analysis) on the transcription 142. The transcription 142 refers to a sequence of text that the device 110 may then use to generate a response to the query or the command. For instance, if the user 10 asks the device 110 the question of "what will the weather be like today," the device 110 passes the audio data 14 corresponding to the question "what will the weather be like today" to the speech recognition system 140. The speech recognized system 140 converts the audio data 14 into a transcript 142 that includes the text of "what will the weather be like today?" The device 110 may then determine a response to the query using the text or portions of the text. For instance, in order to determine the weather for the current day (i.e., today), the device 110 passes the text (e.g., "what will the weather be like today?") or identifying portions of the text (e.g., "weather" and "today") to a search engine. The search engine may then return one or more search results that the device 110 interprets to generate a response for the user 10.

In some implementations, the device 110 or a system associated with the device 110 identifies text 152 (also referred to as a sequence of text 152 or input text 152) that the device 110 will communicate to the user 10 as a response to a query of the spoken utterance 12. The device 110 may then use the TTS system 150 to convert the text 152 into corresponding synthesized playback audio 154 for the device 110 to communicate to the user 10 (e.g., audibly communicate to the user 10) as the response to the query of the spoken utterance 12. In other words, the TTS system 150 receives, as input, text 152 and converts the text 152 to an output of synthesized playback audio 154 (e.g., through a series of neural networks) where the synthesized playback audio 154 is an audio signal defining an audible rendition of the text 152. For example, the playback audio 154 is a verbalization or a narration of the input text 152. In some examples, the input text 152 refers to a sequence of text or characters in a particular natural language (e.g., English, Spanish, or French). The sequence of characters can include letters, numbers, punctuation marks, and/or other special characters. When the TTS system 150 generates the playback audio 154, the playback audio 154 includes synthesized speech that approximates how a human would verbalize the sequence of characters defining the input text 152.

The TTS system 150 (or other speech synthesis system) includes a TTS model 200 (e.g., the TTS model 200 of FIG. 2) that utilizes a deep neural network (e.g., an attention-based Tacotron network) to generate the synthesized playback audio 154. In some implementations, the TTS model 200 processes embeddings that are encoded representations of speech features (e.g., features of the input text 152) to generate audio waveforms (e.g., time-domain audio waveforms that define an audio signal's amplitude over time). Once generated, the TTS system 150 communicates the synthesized playback audio 154 to the device 110 to allow the device 110 to output the synthesized playback audio 154. For instance, the device 110 audibly outputs the synthesized playback audio 154 of "today is sunny" from the one or more speakers 118. Here, the TTS model 200 of the TTS system 150 is configured to control the speech-related attributes of the synthesized speech 154. In other words, the TTS model 200 is configured to simulate the voice of a human speaker in terms of naturalness while also being able to generate diverse synthesized speech by modeling fine-grained latent features. Although FIG. 1 depicts an example of a TTS system 150 in the context of an assistant application, the TTS system 150 (e.g., using the TTS model 200) is applicable in other text-to-speech scenarios, such as, for example, voice search, navigation or reading documents.

Figure 2A:
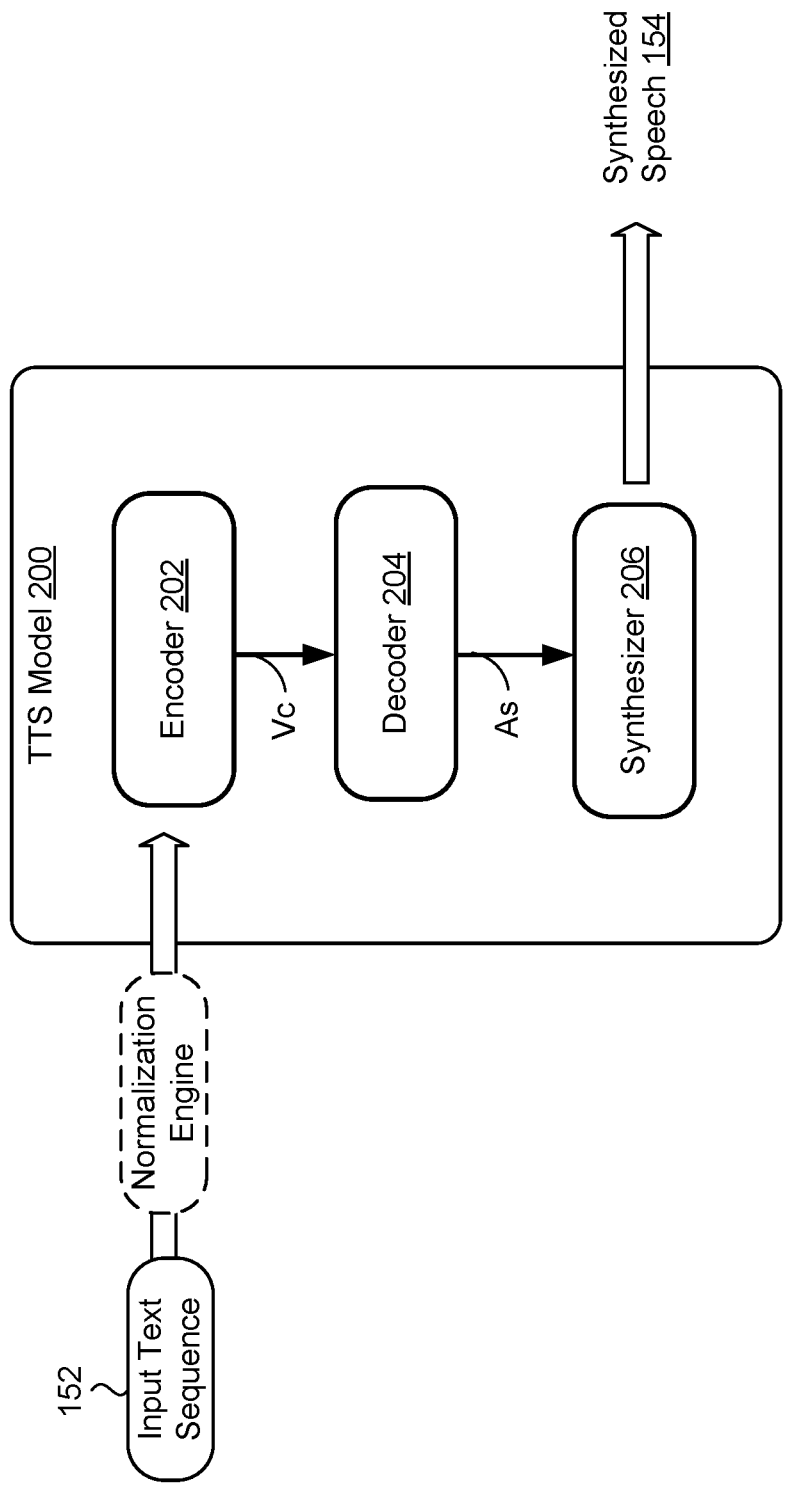
FIGS. 2A-2C are schematic views of example text-to-speech models for generating diverse and natural text-to-speech samples.
Figure 2B:
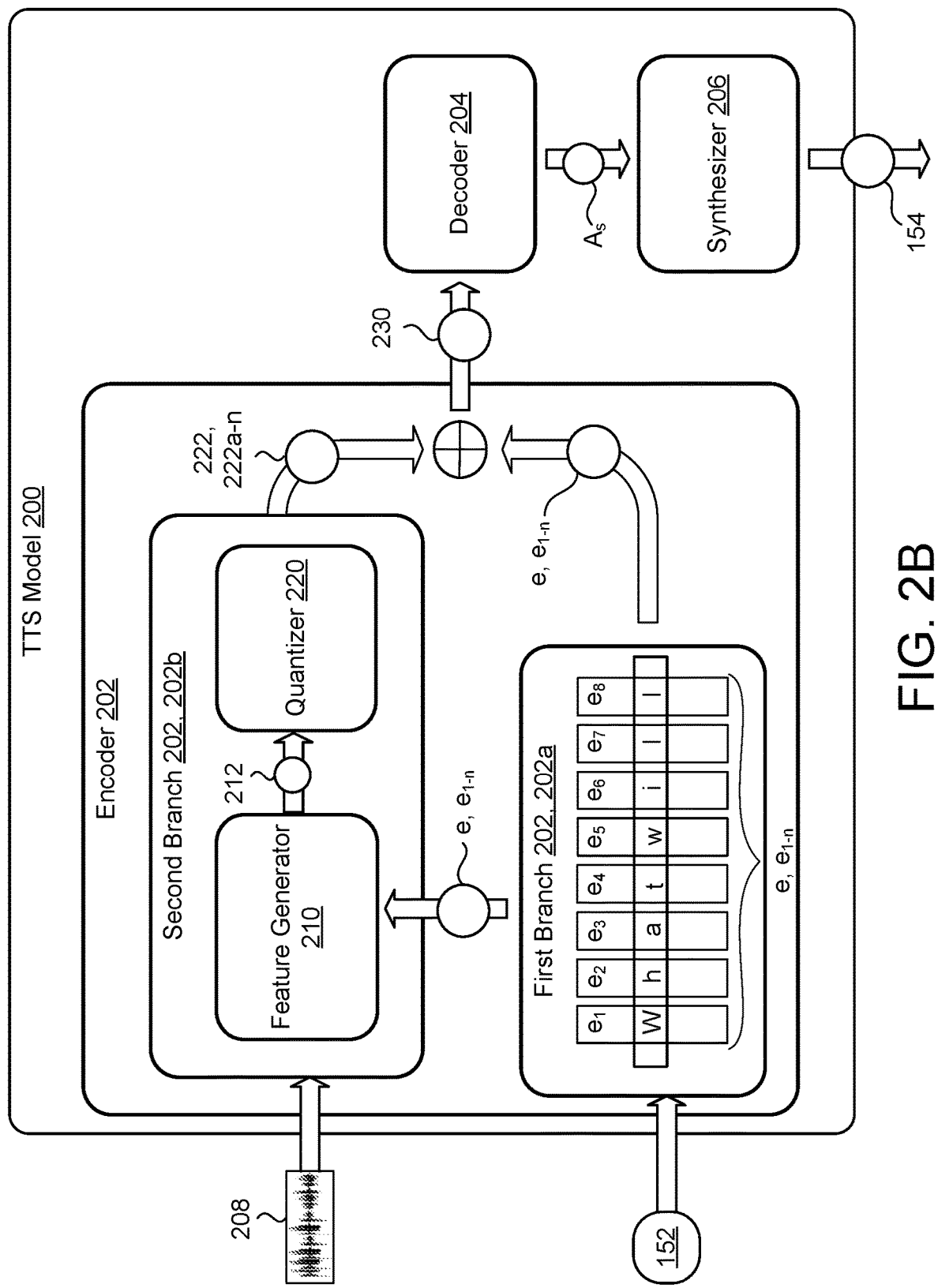
Figure 2C:
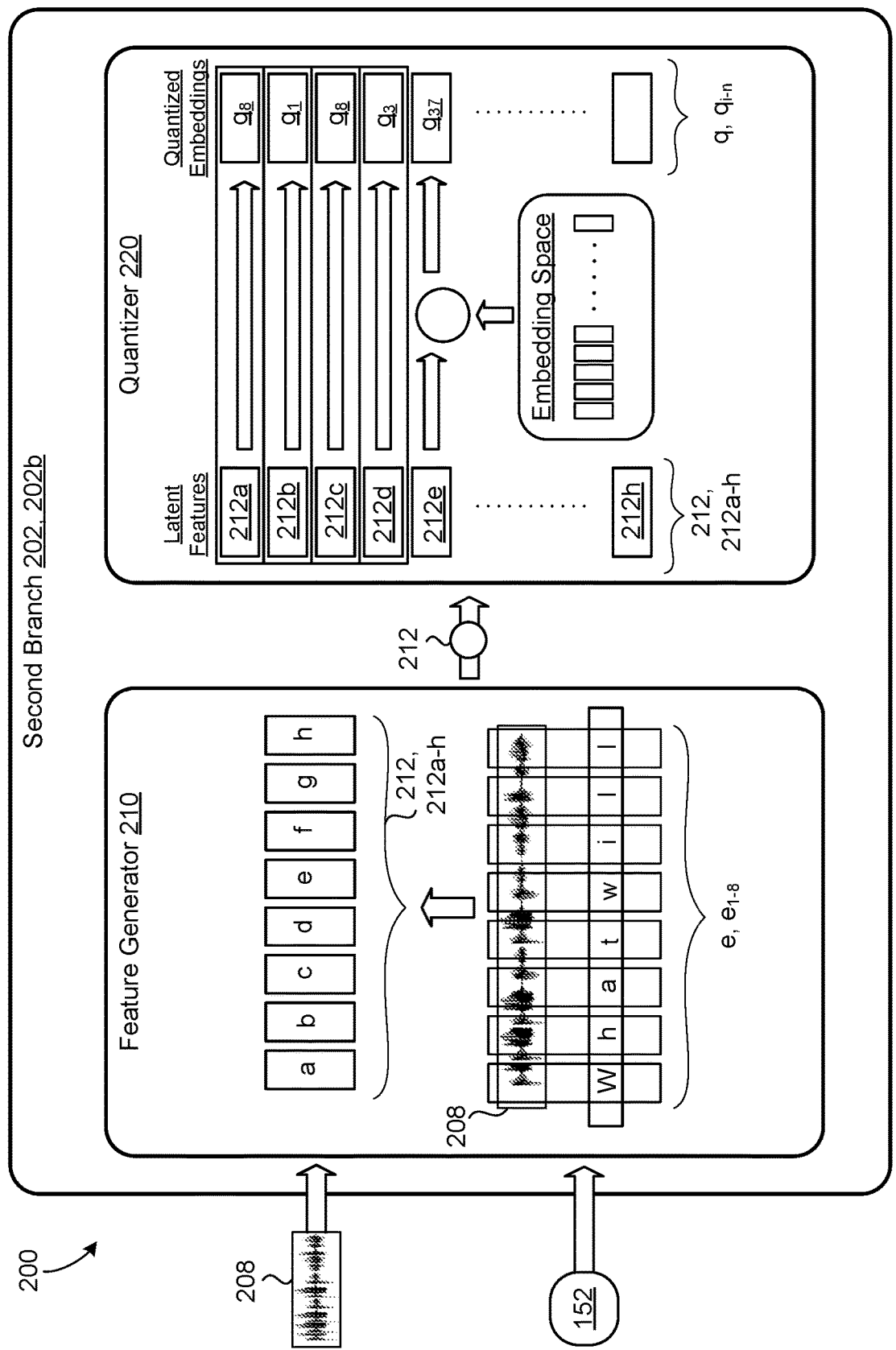

Referring to FIGS. 2A-2C, in some examples, the TTS model 200 has an encoder-decoder network architecture that includes an encoder 202 and a decoder 204. In some implementations, the encoder-decoder 202, 204 structure corresponds to the sequence-to-sequence recurrent neural network (RNN) of Tacotron 2 (e.g., described in Shen, *Natural TTS Synthesis by Conditioning WaveNet on Mel Spectrogram Predictions*, available at https://arxiv.org/pdf/1712.05884.pdf, and incorporated herein by reference). In some configurations, the encoder 202 is configured to receive the input text 152 or an embedding corresponding to the input text 152 (e.g., character embeddings) and to generate a context vector Vc for each Mel frequency spectrogram that the decoder 204 will later generate. The context vector Vc may be a fixed length and generally define features that appear in particular positions corresponding to the sequence of characters forming the input text 152. In some configurations, the text input 152 is first converted into a phoneme sequence (e.g., via a normalization engine) prior to being input into the encoder 202.

The encoder 202 may include one or more convolutionaal layers followed by a bidirectional long short-term memory (LTSM) layer. The neurons in each convolution layer may receive input from a small subset of neurons in a previous layer. In this respect, neuron connectivity allows the convolutional layers to learn filters that activate when particular hidden features appear in positions in the sequence of characters corresponding to the input text 152. In some implementations, the filter in each convolutional layer may span a series of characters (e.g., four, five, or six characters). Each convolutional layer may be followed by batch normalization and rectified linear units (RELUs). When the encoder 202 includes one or more convolutional layers, a bidirectional LSTM layer may follow these convolutional layers. Here, the bidirectional LSTM is configured to process the hidden features generated by the final convolutional layer in order to generate a sequential feature representation of the sequence of characters corresponding to the input text 152. The sequential feature representation may include a sequence of feature vectors.

In some implementations, the encoder 202 also includes an attention network configured to receive a sequential feature representation from the encoder 204 and to process the sequential feature representation to generate the context vector Vc for each decoder output step. That is, the attention network can generate a fixed length context vector Vc for each frame of a Mel frequency spectrogram that a decoder 204 will later generate. A frame refers to a unit of the Mel frequency spectrogram that is based on a small portion of the input signal (e.g., a 10 millisecond sample). The architecture of the attention network may vary depending on the particular TTS system 150. Some examples of attention networks include additive attention networks, location sensitive attention networks, Gaussian Mixture Model (GMM) attention networks (e.g., to improve generalization to long utterances), forward attention networks, stepwise monotonic attention networks, or dynamic convolution attention networks. With an attention network, the model 200 may be able to generate an output sequence (e.g., a sequence of output log-mel spectrogram frames) based on additional inputs (e.g., with speech embeddings e) that receive particular attention weights in order to generate the context vector Vc.

The decoder 204 is configured as a neural network (e.g., an autoregressive recurrent neural network) to generate an output audio signal As (e.g., an output sequence mel-frequency spectrograms) of expressive speech that includes the intended speech-related attributes (e.g., the intended prosody and/or speech characteristics). For instance, based on the context vector Vc, the decoder 204 predicts a representation of a speech signal (e.g., a mel frame or spectrogram frame) from the encoded representation generated by the encoder 202. That is, the decoder 204 is configured to receive, as input, one or more context vectors Vc and may generate, for each context vector Vc, a corresponding frame of a mel-frequency spectrogram where a mel-frequency spectrogram is a frequency-domain representation of sound. In some examples, the decoder 204 includes an architecture similar to Tacotron 2. In other words, the decoder 204 may include an architecture having a pre-net, a Long Short-Term Memory (LSTM) subnetwork, a linear projection, and a convolutional post-net.

In some configurations, the TTS model 200 also includes a speech synthesizer 206 (also referred to as a synthesizer 206). The synthesizer 206 can be any network that is configured to receive a Mel frequency spectrogram and to generate audio output samples based on the Mel frequency spectrogram as synthesized speech 154. In some other implementations, the synthesizer 206 includes a vocoder. For instance, the speech synthesizer 206 may include a WaveRNN vocoder (e.g., as described by "Natural TTS Synthesis by Conditioning WaveNet on Mel Spectrogram Predictions," by J. Shen, et al., available at, e.g., https://arxiv.org/abs/1712.05884). Here, the WaveRNN vocoder may generate 16-bit signals sampled at 24 kHz conditioned on spectrograms predicted by the TTS model 200. In some other implementations, the synthesizer 206 is a trainable spectrogram to waveform inverter. After the synthesizer 206 generates the waveform, an audio subsystem can generate the synthesized speech 154 using a waveform and provide the synthesized speech 154 for playback (e.g., on the device 110), or provide the generated waveform to another system to allow the other system to generate and play back the synthesized speech 154. Generally speaking, the synthesizer 206 has little to no impact on resulting prosody and/or style of the synthesized speech 154, and in practice, only impacts audio fidelity of the synthesized speech 154 as the synthesizer 206 converts a representation of a speech signal (e.g., a mel frame or spectrogram frame output by the decoder 204) into a waveform.

With continued reference to FIGS. 2B and 2C, in some implementations, the encoder 202 is a two branch system that includes a first branch, referred to as a first encoder portion 202, 202a and a second branch, referred to as a second encoder portion 202, 202b. In some examples, the first encoder portion 202a refers to the functionality of the encoder used in Tacotron 2 while the second encoder portion 202b enables the Tacotron 2 structure to incorporate a QF-VAE into its encoder structure in order to generate diverse and natural speech samples. The first encoder portion 202a receives a sequence of text 152, as input, and generates encodings referred to as speech embeddings e, that represent the sequence of text 152. For instance, the first encoder portion 202a divides or identifies a sequence of speech units associated with the sequence of text 152 and generates a speech embedding e that corresponds to each identified speech unit. In some examples, the speech unit is a phoneme and the first encoder portion 202a generates a speech embedding e for each phoneme present in the sequence of text 152. To illustrate, FIG. 2B depicts the TTS model 200 receiving, as input, text 152 that corresponds to a portion of the query, "What will the weather be like today." Here, the first encoder portion 202a identifies that this text 152 includes eight phonemes and generates eight speech embeddings e, $e_{1-8}$ where each speech embedding e corresponds to an encoded representation of a phoneme. The first encoder portion 202b may then pass the speech embeddings e that it generates to the second encoder branch 202b.

The second branch 202b operates in conjunction with the first branch 202a to generate latent features 212 using a feature generator 210. The latent features 212 represent speech-related attributes, such as prosody, in an encoded form. The second encoder portion 202b encodes the speech-related attributes associated with each speech unit of the input text 152 that is identified by the first encoder branch 202a. In some examples, to generate the latent features 212, the second encoder portion 202b needs to identify a target or reference spectrogram 208 that includes speech-related attributes. That is, a text sequence 152 generally consists of characters without any labels or identifiers of speech-related attributes that correspond to the text sequence 152. With this being the case, the feature generator 210 of the second encoder portion 202b is configured to obtain a reference spectrogram 208 that represents a distribution of the latent variable space (i.e., a space representing speech-related attributes). In some examples, to obtain the reference spectrogram 208, the feature generator 210 samples the distribution of the latent variable space. When the feature generator 210 obtains the reference spectrogram 208, the feature generator 210 aligns the sequence of embeddings e corresponding to the text input 152 received from the first encoder portion 202a with the reference spectrogram 208.

In some implementations, the feature generator 210 aligns the sequence of embeddings e, $e_{1-n}$ corresponding to the text input 152 received from the first encoder portion 202a with the reference spectrogram 208 by using an attention mechanism (e.g., a location sensitive attention mechanism). By aligning the sequence of embeddings e corresponding to the text input 152 received from the first encoder portion 202a with the reference spectrogram 208, the feature generator 210 identifies portions of the reference spectrogram 208 from which the feature generator 210 will extract latent features 212. That is, the feature generator 210 extracts latent features 212, 212a-n (FIG. 2C) from the corresponding portion of the reference spectrogram 208 aligned with the speech embedding e generated by the first encoder portion 202a. In the example of FIG. 2C, when the eight embeddings $e_{1-8}$ align with the reference spectrogram 208, the feature generator 210 identifies eights segments or portions of the reference spectrogram 208. For each identified segment of the eight segments of the reference spectrogram 208, the feature generator 210 extracts a latent feature 212 (e.g., speech related attribute) to represent that particular segment. In FIG. 2C, the feature generator 210 generates or extracts eight latent features 212, 212a-h corresponding to the eight phonemes or speech units from the input text 152. By generating the latent features 212 for the speech units (e.g., phonemes) identified by the first encoder branch 202a, the feature generator 210 serves to represent speech-related attributes on the fine-grained level.

The feature generator 210 communicates the latent features 212 to a quantizer 220 of the second encoder portion 202b. The quantizer 220 is configured to perform a quantization process. A quantization process generally refers to a process that converts input parameters into a smaller data set of output values. In some examples, the quantizer includes a codebook that contains some number of different quantized embeddings q, $q_{1-n}$. In other words, the codebook functions as a database of different quantized embeddings q where the size of the codebook corresponds to the number potential discrete quantized embeddings q that may represent a particular continuous latent feature 212. The quantizer 220 is configured to determine which codebook entry or quantized embedding q should represent a particular latent feature 212. In some examples, the quantizer 220 determines which quantized embedding q should represent a particular latent feature 212 by determining a quantized embedding q that minimizes a Euclidian distance between each respective quantized embedding q and the particular latent feature 212. More particularly, the quantizer 220 determines a respective Euclidian distance between each respective quantized embedding q and the particular latent feature 212, which generates a plurality of Euclidean distances. From the plurality of Euclidean distances, the quantizer 220 selects the smallest Euclidean distance (i.e., a minima) and determines that the quantized embedding q corresponding to the smallest Euclidean distance will represent the latent feature 212 as a quantized embedding q for the latent feature 212. That is, the quantizer 220 will assign the quantized embedding q corresponding to the smallest Euclidean distance to the latent feature 212.

Referring to FIG. 2C, the quantizer 220 is shown determining the quantized embedding q that will represent each of the eight latent features 212, 212a-h generated by the feature generator 210. For instance, here, the embedding space represents the codebook of potential quantized embeddings q. In this example, the quantizer 220 has already assigned an eighth quantized embedding q, $q_8$ to a first latent feature 212a, a first quantized embedding q, $q_1$ to a second latent feature 212b, the eighth quantized embedding q, $q_8$ to also represent a third latent feature 212c, a third quantized embedding q, $q_3$ to a fourth latent feature 212d, and is currently assigning a thirty-seventh quantized embedding q, $q_{37}$ to a fifth latent feature 212e. In this example, the eighth quantized embedding $q_8$ represents both the first latent feature 212a and the third latent feature 212c because it is the best representative quantized embedding q for both latent features 212a,c (e.g., according to a minimum Euclidean distance approach). Here, the first latent feature 212a could be the same as the third latent feature 212c or different, but still closest to the same representative quantized embedding q.

With a two branch encoder 202, each branch 202a,b communicates embeddings to the decoder 204. The first branch 202a generates speech embeddings e for speech units of the input text 152. The second branch 202b generates quantized embeddings q that represent speech-related attributes extracted from speech units aligned with speech embeddings e from the first branch 202a. In some examples, such as FIG. 2B, the encoder 202 concatenates together the quantized embeddings q for the input text 152 from the second branch 202b and the speech embeddings e from the first branch 202a and passes the resulting concatenation embedding(s) 230 to the decoder 204 for reconstruction (i.e., the decoder 204 decodes the resulting concatenation embedding 230). For example, the each branch 202a,b generates a sequence of embeddings that are concatenated together at each step in the sequence prior to being passed to the decoder 204.

Figure 3:
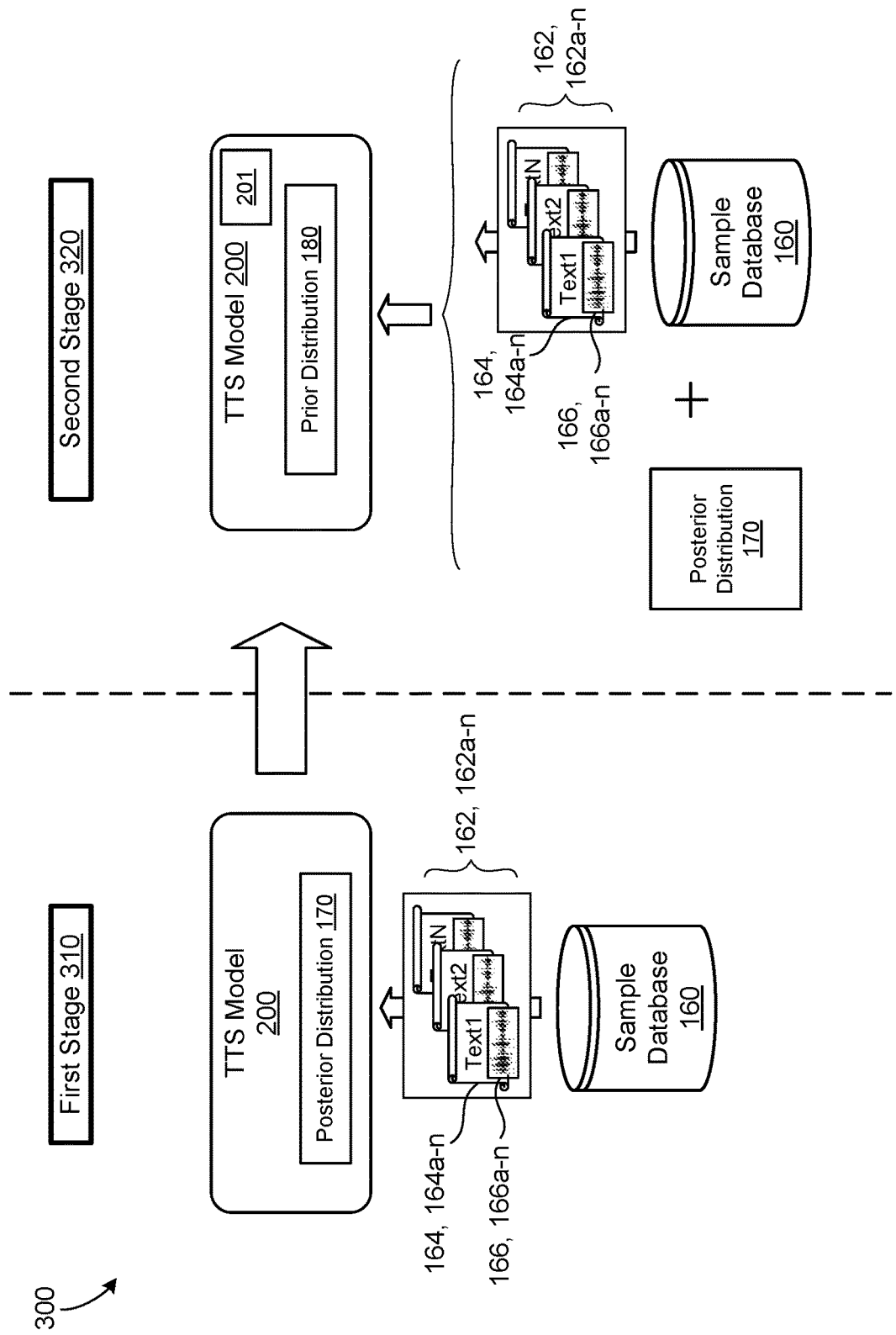
FIG. 3 is a schematic view of an example training process for training the text-to-speech speech model for the text-to-speech system of the speech environment of FIG. 1.

Referring to FIG. 3, in order to teach the TTS model 200 to generate diverse and natural synthesized speech samples 154, the TTS model 200 undergoes a training process 300. During a first stage 310 of the training process 300, the training process 300 trains the TTS model 200 to generate one or more synthesized speech samples 154 using a plurality of training samples 162, 162a-n. Each training sample 162 of the plurality of the training samples 162, 162a-n includes a training sequence of text 164 and a reference training spectrogram 166 corresponding to the training sequence of text 164. That is, each training sample 162 includes a respective training spectrogram 166 representing an utterance and a respective training sequence of text 164 corresponding to a transcription of the utterance. During the first stage 310 of the training process 300, the training process 300 uses a maximum likelihood approach to train the encoder-decoder 202, 204 networks together. That is, during the first stage 310, the encoder/decoder 202, 204 receives, as input, a correct output from the previous time step in a training technique known as teacher forcing. With a training sequence of text 164 and its corresponding reference training spectrogram 166, the training process 300 trains the TTS model 200 to process the training sample 162 in a manner similar to implementation of the TTS model 200 (i.e., inference) as described in FIGS. 2A-2C. The training process 300 then repeats these training steps for each training sample 162 in order to ensure the TTS model 200 is capable of generating a natural and diverse synthesized speech samples 154 for a particular sequence of text 152. In some examples, the training process 300 trains the TTS model 200 by optimizing an evidence lower bound (ELBO) loss during the training process 300. The ELBO loss may be represented by the following equation:

$$\mathcal{L}(p, q) = E_{q(z|x)}(\log p(X|Y, z)) - \beta \sum_{n=1}^{N} D_{kL}(q(z_n|X, Y_n) \| p(z_n)) \quad (1)$$

where the first term, $E_{q(Z|X)}(\log p(X|Y,z))$, is a reconstruction loss, the second term, $\beta \Sigma_{n=1}^{N} D_{kL}(q(z_n|X, Y_n) \| p(z_n))$ is a KL divergence between a prior distribution and a posterior distribution, the z represents the sequence of latent features where $z_n$ corresponds to the latent representation for the n-th phoneme. Here, X is the reference training spectrogram 166 and Y represents the speech embedding e (e.g., the phoneme encoding from the first branch 200a).

For each training sample 162, the training process 300 in the first stage 310 identifies a sequence of speech units associated with the training sequence of text 164 corresponding to the reference training spectrogram 166. For each speech unit of the sequence of speech units, the training process 300 trains the TTS model 200 (e.g., at the first encoder branch 202a) to generate a speech embedding e and to align the speech embedding e with a corresponding portion of the reference training spectrogram 166. For the corresponding portion of the reference training spectrogram 166, the training process 300 trains the TTS model 200 (e.g., at the second encoder branch 202b) to extract a latent feature 212 from the corresponding portion of the reference training spectrogram 166 that aligns with the speech embedding e. The training process 300 proceeds to train the model 200 to assign a quantized embedding q to the latent feature 212 from the corresponding portion of the reference training spectrogram 166 aligned with the speech embedding e. With the speech embeddings e and the quantized embeddings q for the sequence of speech units associated with the training sequence of text 164 corresponding to the reference training spectrogram 166, the training process 300 trains the decoder 204 to decode a concatenation 230 of the speech embeddings e and the quantized embeddings q.

After the training process 300 repeats for multiple training samples 162, the training process 300 trains the TTS model 200 to learn how to generate an accurate posterior distribution 170 of the latent space. Unfortunately, since the posterior distribution 170 is derived from a real speech spectrogram (i.e., the reference training spectrogram 166), when the model 200 proceeds to inference, the model 200 will receive input text 152 without a corresponding reference spectrogram 166. Without a reference spectrogram 166, the TTS model 200 will be without guidance for latent feature generation.

To overcome this lack of a reference spectrogram 208, a second stage 320 of the training process 300 trains an autoregressive (AR) prior network 201 of the model 200 to model temporal coherency in the latent feature sequence from the posterior distribution 170. That is, the AR prior network 201 is trained to fit the posterior distribution 170 over the training data 162 learned in the first stage 310 in order to form a prior distribution 180. With a prior distribution 180 fit to the posterior distribution 170, the AR prior network 201 may feed a reference spectrogram 208 to the model 200 when it receives input text 152 in order to guide the latent feature generation for the model 200. During the training process 300 in the second stage 320, the training process 300 aims to fit the AR prior in the continuous latent space so that the prior distribution 180 and the posterior distribution 180 at each time step come from the same family of distributions. In some examples, similar to the first stage 310, the training process 300 of the second stage 320 trains the AR prior network 201 using a teacher forcing technique from the latent feature sequence of the posterior distribution 170. In some implementations, the second stage 320 trains the AR prior network 201 separately from other portions of the TTS model 200 in order to avoid affecting the training of the posterior distribution 170 (i.e., the first stage 310). The AR prior network 201 may be an additional component of the TTS model 200 or part of another component of the TTS model 200. For example, the synthesizer 206 may function as the AR prior network 201 trained by the second stage 320 of the training process 300.

Figure 4:
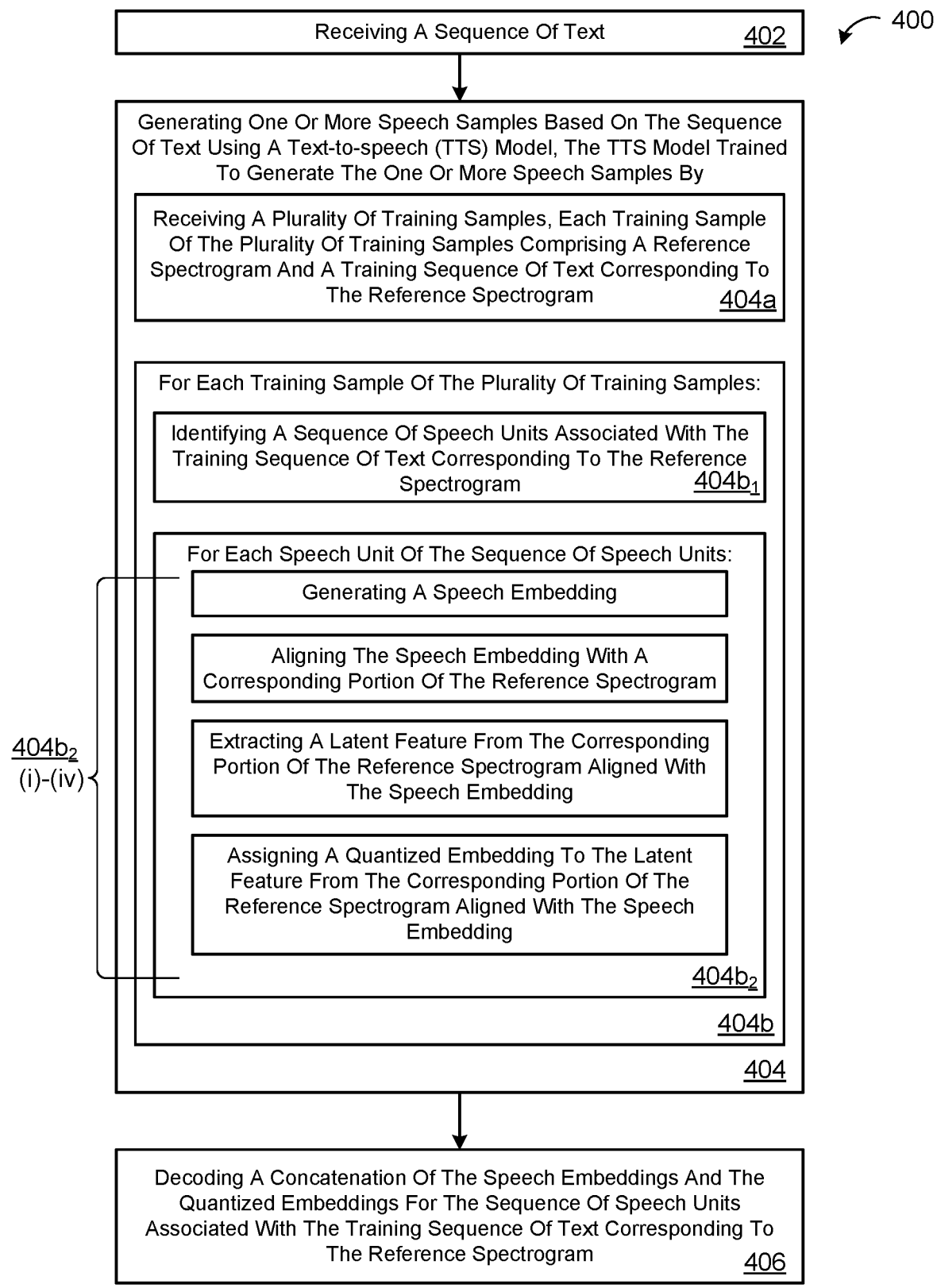
FIG. 4 is a flowchart of an example arrangement of operations for a method of generating diverse and natural text-to-speech samples.

FIG. 4 is a flowchart of an example arrangement of operations for a method 400 of generating diverse and natural text-to-speech samples. At operation 402, the method 400 receives a sequence of text 152. At operation 404, the method generates one or more speech samples 154 based on the sequence of text 152 using a text-to-speech (TTS) model 200. At operations 404a and 404b, the method 400 trains the TTS model to generate one or more speech samples 154. At operation 404a, the method 400 receives a plurality of training samples 162 where each training sample 162 of the plurality of training samples 162 includes a reference spectrogram 166 and a training sequence of text 164 corresponding to the reference spectrogram 166. Operations 404b includes two sub-operations 404b1 and 404b2 that the method 400 performs on each training sample 162 of the plurality of training samples 162. At sub-operation 404b1, the method 400 identifies a sequence of speech units associated with the training sequence of text 164 corresponding to the reference spectrogram 166. Here, sub-operation 404b2 is divided into four steps (i)-(iv) that the method 400 performs for each speech unit of the sequence of speech units. At step (i) of sub-operation 404b2, the method 400 generates a speech embedding e. At step (ii) of sub-operation 404b2, the method 400 aligns the speech embedding e with a corresponding portion of the reference spectrogram 166. At step (iii) of sub-operation 404b2, the method 400 extracts a latent feature 212 from the corresponding portion of the reference spectrogram 166 aligned with the speech embedding e. At step (iv) of sub-operation 404b2, the method 400 assigns a quantized embedding q to the latent feature 212 from the corresponding portion of the reference spectrogram 166 aligned with the speech embedding e. At operations 406, the method 400 decodes a concatenation 230 of the speech embeddings e and the quantized embeddings q for the sequence of speech units associated with the training sequence of text 164 corresponding to the reference spectrogram 166.

Figure 5:
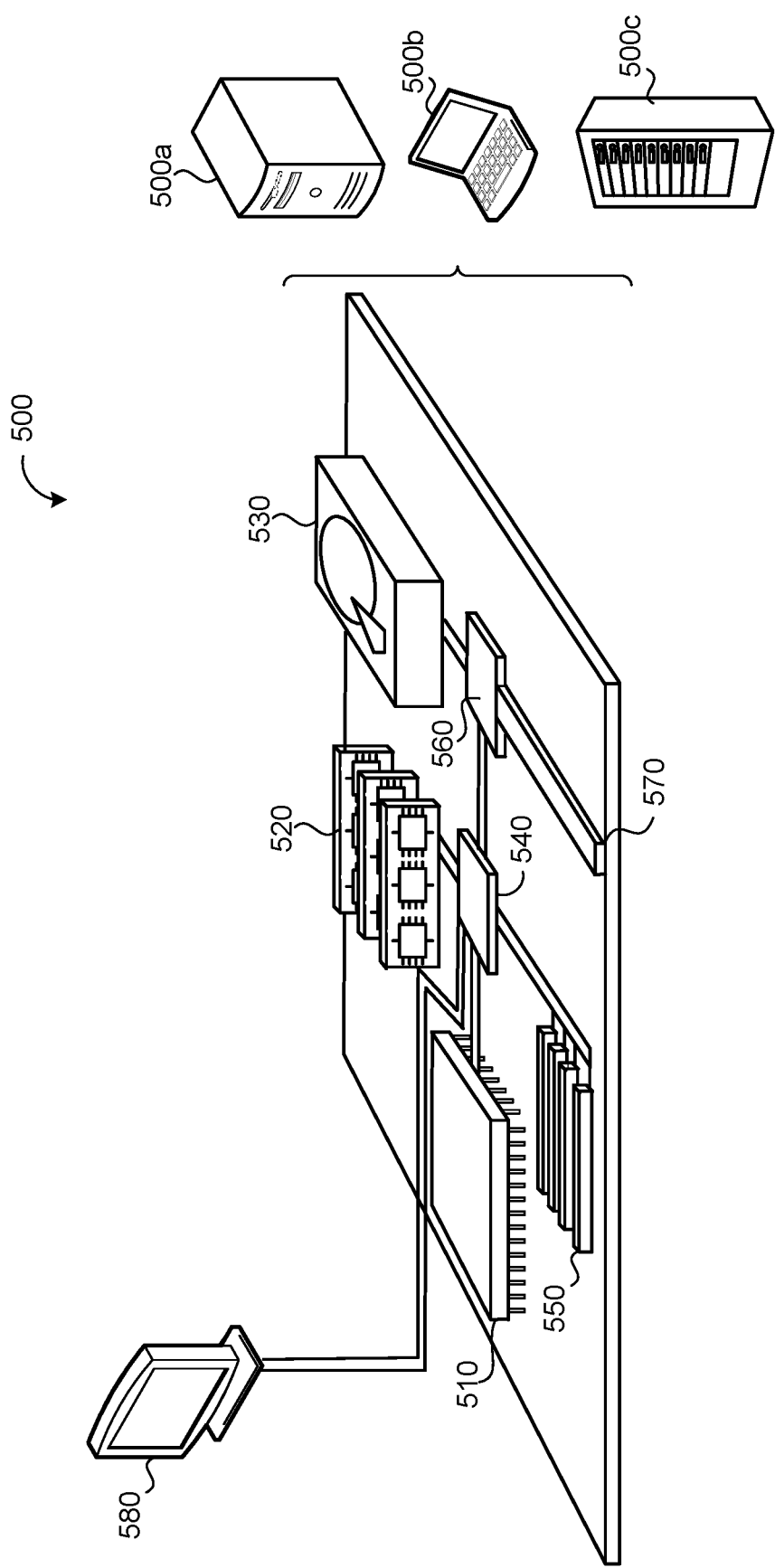
FIG. 5 is a schematic view of an example computing device that may be used to implement the systems and methods described herein.

FIG. 5 is schematic view of an example computing device 500 that may be used to implement the systems (the device 110, the speech recognition system 140, the TTS system 150, and/or the TTS model 200) and methods (e.g., the method 400) described in this document. The computing device 500 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 500 includes a processor 510 (e.g., data processing hardware), memory 520 (e.g., memory hardware), a storage device 530, a high-speed interface/controller 540 connecting to the memory 520 and high-speed expansion ports 550, and a low speed interface/controller 560 connecting to a low speed bus 570 and a storage device 530. Each of the components 510, 520, 530, 540, 550, and 560, are interconnected using various busses, and may be mounted on a common motherboard or in other manners as appropriate. The processor 510 can process instructions for execution within the computing device 500, including instructions stored in the memory 520 or on the storage device 530 to display graphical information for a graphical user interface (GUI) on an external input/output device, such as display 580 coupled to high speed interface 540. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 520 stores information non-transitorily within the computing device 500. The memory 520 may be a computer-readable medium, a volatile memory unit(s), or non-volatile memory unit(s). The non-transitory memory 520 may be physical devices used to store programs (e.g., sequences of instructions) or data (e.g., program state information) on a temporary or permanent basis for use by the computing device 500. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 530 is capable of providing mass storage for the computing device 500. In some implementations, the storage device 530 is a computer-readable medium. In various different implementations, the storage device 530 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 520, the storage device 530, or memory on processor 510.

The high speed controller 540 manages bandwidth-intensive operations for the computing device 500, while the low speed controller 560 manages lower bandwidth-intensive operations. Such allocation of duties is exemplary only. In some implementations, the high-speed controller 540 is coupled to the memory 520, the display 580 (e.g., through a graphics processor or accelerator), and to the high-speed expansion ports 550, which may accept various expansion cards (not shown). In some implementations, the low-speed controller 560 is coupled to the storage device 530 and a low-speed expansion port 590. The low-speed expansion port 590, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 500a or multiple times in a group of such servers 500a, as a laptop computer 500b, or as part of a rack server system 500c.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A computer-implemented method when executed by data processing hardware causes the data processing hardware to perform operations comprising:
   receiving a sequence of text; and
   generating one or more speech samples based on the sequence of text using a text-to-speech (TTS) model, the TTS model trained to generate the one or more speech samples by:
      receiving a plurality of training samples, each training sample of the plurality of training samples comprising a reference spectrogram and a training sequence of text corresponding to the reference spectrogram; and
      for each training sample of the plurality of training samples:
         identifying a sequence of speech units associated with the training sequence of text corresponding to the reference spectrogram;
         for each speech unit of the sequence of speech units:
            generating a speech embedding;
            aligning the speech embedding with a corresponding portion of the reference spectrogram;
            extracting a latent feature from the corresponding portion of the reference spectrogram aligned with the speech embedding; and
            assigning a quantized embedding to the latent feature from the corresponding portion of the reference spectrogram aligned with the speech embedding; and
         decoding a concatenation of the speech embeddings and the quantized embeddings for the sequence of speech units associated with the training sequence of text corresponding to the reference spectrogram.

2. The method of claim 1, wherein assigning the quantized embedding to the latent feature from the corresponding portion of the reference spectrogram aligned with the speech embedding comprises assigning the quantized embedding to the latent feature from the corresponding portion of the reference spectrogram aligned with the speech embedding after sampling the quantized embedding from a posterior distribution in a continuous latent space.

3. The method of claim 1, wherein the operations further comprise:
   for each of a plurality of available quantized embeddings, determining a Euclidean distance between the corresponding quantized embedding and the latent feature extracted from the corresponding portion of the reference spectrogram aligned with the speech embedding; and
   selecting, from among the plurality of available quantized embeddings, the quantized embedding associated with a minimum Euclidean distance between the corresponding quantized embedding and the latent feature extracted from the corresponding portion of the reference spectrogram aligned with the speech embedding,
   wherein assigning the quantized embedding to the latent feature comprises assigning the selected quantized embedding associated with the minimum Euclidean distance.

4. The method of claim 1, wherein the operations further comprise, during training of the TTS model:
   determining a reconstruction loss represented as a likelihood probability based on the speech embedding and the latent feature;
   determining a KL divergence between a prior distribution of the latent feature and a posterior distribution of the latent feature; and
   optimizing an evidence lower bound (ELBO) loss of the TTS model based on a difference between the determined reconstruction loss and the determined KL divergence.

5. The method of claim 1, wherein the operations further comprise, during training the TTS model:
   generating, as output from the TTS model, a posterior distribution for the plurality of training samples; and
   training an autoregressive (AR) prior neural network to generate a prior distribution by fitting the generated posterior distribution over the plurality of training samples.

6. The method of claim 5, wherein generating the one or more speech samples is based on sampling the prior distribution from the trained AR prior neural network.

7. The method of claim 1, wherein the sequence speech units comprises a sequence of phonemes.

8. The method of claim 1, wherein the latent feature comprises a latent prosody feature.

9. The method of claim 1, wherein the one or more speech samples comprise a first speech sample and a second speech sample, the first speech sample having different speech attributes than the second speech sample.

10. The method of claim 1, wherein the operations further comprise training a speech recognition model using the one or more speech samples generated by the TTS model.

11. A system comprising:
    data processing hardware; and
    memory hardware in communication with the data processing hardware, the memory hardware storing instructions that when executed on the data processing hardware cause the data processing hardware to perform operations comprising:
       receiving a sequence of text; and
       generating one or more speech samples based on the sequence of text using a text-to-speech (TTS) model, the TTS model trained to generate the one or more speech samples by:

receiving a plurality of training samples, each training sample of the plurality of training samples comprising a reference spectrogram and a training sequence of text corresponding to the reference spectrogram; and for each training sample of the plurality of training samples:

identifying a sequence of speech units associated with the training sequence of text corresponding to the reference spectrogram;

for each speech unit of the sequence of speech units:

generating a speech embedding;

aligning the speech embedding with a corresponding portion of the reference spectrogram;

extracting a latent feature from the corresponding portion of the reference spectrogram aligned with the speech embedding; and assigning a quantized embedding to the latent feature from the corresponding portion of the reference spectrogram aligned with the speech embedding; and decoding a concatenation of the speech embeddings and the quantized embeddings for the sequence of speech units associated with the training sequence of text corresponding to the reference spectrogram.

12. The system of claim 11, wherein assigning the quantized embedding to the latent feature from the corresponding portion of the reference spectrogram aligned with the speech embedding comprises assigning the quantized embedding to the latent feature from the corresponding portion of the reference spectrogram aligned with the speech embedding after sampling the quantized embedding from a posterior distribution in a continuous latent space.

13. The system of claim 11, wherein the operations further comprise:

for each of a plurality of available quantized embeddings, determining a Euclidean distance between the corresponding quantized embedding and the latent feature extracted from the corresponding portion of the reference spectrogram aligned with the speech embedding; and selecting, from among the plurality of available quantized embeddings, the quantized embedding associated with a minimum Euclidean distance between the corresponding quantized embedding and the latent feature extracted from the corresponding portion of the reference spectrogram aligned with the speech embedding, wherein assigning the quantized embedding to the latent feature comprises assigning the selected quantized embedding associated with the minimum Euclidean distance.

14. The method of claim 1, wherein the operations further comprise, during training of the TTS model:

determining a reconstruction loss represented as a likelihood probability based on the speech embedding and the latent feature;

determining a KL divergence between a prior distribution of the latent feature and a posterior distribution of the latent feature; and optimizing an evidence lower bound (ELBO) loss of the TTS model based on a difference between the determined reconstruction loss and the determined KL divergence.

15. The system of claim 11, wherein the operations further comprise, during training the TTS model:

generating, as output from the TTS model, a posterior distribution for the plurality of training samples; and training an autoregressive (AR) prior neural network to generate a prior distribution by fitting the generated posterior distribution over the plurality of training samples.

16. The system of claim 15, wherein generating the one or more speech samples is based on sampling the prior distribution from the trained AR prior neural network.

17. The system of claim 11, wherein the sequence speech units comprises a sequence of phonemes.

18. The system of claim 11, wherein the latent feature comprises a latent prosody feature.

19. The system of claim 11, wherein the one or more speech samples comprise a first speech sample and a second speech sample, the first speech sample having different speech attributes than the second speech sample.

20. The system of claim 11, wherein the operations further comprise training a speech recognition model using the one or more speech samples generated by the TTS model.

* * * * *